(12) United States Patent
Lin et al.

(10) Patent No.: US 6,549,401 B2
(45) Date of Patent: Apr. 15, 2003

(54) CRADLE

(75) Inventors: Yao-Chung Lin, Taipei (TW); Chia-Hsiung Liu, Taipei (TW)

(73) Assignee: High Tech Computer Corporation, Taoyuan (TW)

( * ) Notice: Subject to any disclaimer, the term of this patent is extended or adjusted under 35 U.S.C. 154(b) by 0 days.

(21) Appl. No.: 09/908,656

(22) Filed: Jul. 20, 2001

(65) Prior Publication Data

US 2002/0024794 A1 Feb. 28, 2002

(30) Foreign Application Priority Data

Jul. 20, 2000 (TW) .......................................... 89212579

(51) Int. Cl.[7] .............................................. G06F 13/62
(52) U.S. Cl. ..................... 361/686; 312/223.2; 220/211; 200/400

(58) Field of Search ................................. 361/686, 685, 361/727, 724–726; 379/446, 455; 312/223.2; 296/97.8; 220/211–213; 200/400; 320/114

(56) References Cited

U.S. PATENT DOCUMENTS

| | | | | |
|---|---|---|---|---|
| 5,956,399 | A | * 9/1999 | Whitley et al. | ............. 379/446 |
| 6,184,654 | B1 | * 2/2001 | Bachner, III et al. | ....... 320/114 |
| 6,341,218 | B1 | * 1/2002 | Poplawsky et al. | ........... 455/90 |

* cited by examiner

*Primary Examiner*—Darren Schuberg
*Assistant Examiner*—Hung Van Duong
(74) *Attorney, Agent, or Firm*—Rabin & Berdo, PC

(57) ABSTRACT

A cradle capable of receiving objects having alternative sizes is provided. The cradle includes a main unit, a slide mechanism and a lock mechanism. The main unit loads and holds the object. The slide mechanism is for adjusting the size of the room for placing the object. The lock mechanism positions the slide mechanism by clasping the slide mechanism.

15 Claims, 5 Drawing Sheets

CRADLE

This application incorporates by reference Taiwanese application Serial No. 089212579, filed Jul. 20, 2000.

BACKGROUND OF THE INVENTION

1. Field of the Invention

The invention relates in general to a cradle, and more particularly to a cradle capable of receiving objects having alternative sizes.

2. Description of the Related Art

The hand-held computer for commercial or personal purpose typically functions as a cellular phone, fax sender, and personal organizer. Users can easily get information on demand due to the portability, compactness and friendly interface of the hand-held computers. Besides, various accessories to the hand-held computer are designed to create additional functionality.

For example, the jacket is an accessory, which not only provides good protection but also makes the hand-held computer more flexible. Users can add a PCMCIA (Personal Computer Memory Card International Association) card or CF (Contact Flash) card to the hand-held computer for additional functionality by inserting the interface card into the jacket to satisfy their individual need. Thus, a hand-held computer with a jacket has become an alternative choice for consumers.

However, the hand-held computer with a jacket is bigger than that without a jacket. This prevents the additional functionality of the jacket from being efficiently used, since the jacket needs to be taken off while the hand-held computer is placed on the cradle. Besides, the hand-held computer can be harmed by taking off the jacket repeatedly.

If the cradle is designed for the hand-held computer with a jacket, a negative effect of the battery charging quality or data transmission may result by simply placing the hand-held computer without a jacket on the cradle due to the unsteady connection.

SUMMARY OF THE INVENTION

It is therefore an object of the invention to provide a cradle capable of firmly receiving objects having alternative sizes to avoid the negative effect of battery charging quality or data transmission due to unsteady connection. The bi-directional data transmission can be proceeded by connecting with a computer host and the battery charging of the object can be proceeded by plugging in.

The invention achieves the above-identified objects by providing a cradle capable of receiving objects having alternative sizes. The cradle includes a main unit, a slide mechanism and a lock mechanism. The main unit loads and holds the object. The slide mechanism has two slide members, which move along the insides of the arc blades of the body upwards or downwards, for adjusting the size of the room for receiving the objects. The lock mechanism positions the slide mechanism by clasping the slide mechanism. The port connected with the computer host for bi-directional data transmission with the objects and the socket plugged in for battery charging of the objects are disposed on the rear side of the body.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
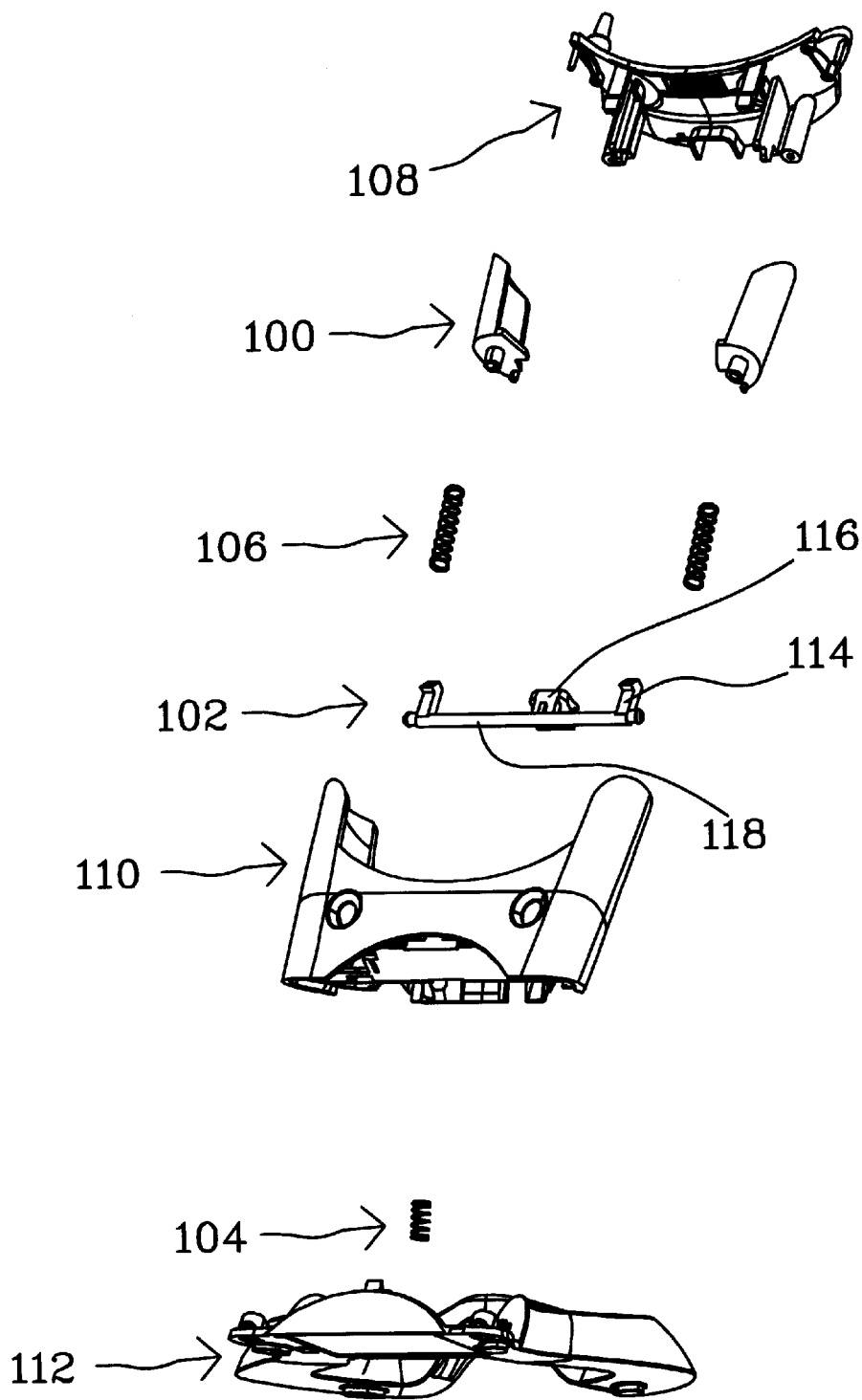
FIG. 1 illustrates an exploded view of a cradle according to a preferred embodiment of the invention.

Referring first to FIG. 1, an exploded view of a cradle according to a preferred embodiment of the invention is illustrated. The cradle includes a main unit, slide mechanism and lock mechanism. The main unit further includes a cap 108, body 110, and base 112. The top and bottom of the body 110 are coupled with the cap 108 and base 112 respectively. The cap 108 and body 110 are for holding an object while the base 112 is for loading and fixing it. The slide mechanism capable of adjusting the size of the room for placing the object includes two slide members 100 and two slide springs 106. The slide springs 106 are coupled with the bottom of the slide members 100. The lock mechanism positions the slide mechanism by clasping the slide mechanism. The lock mechanism includes a slidelock 102 and a slidelock spring 104. The slidelock spring 104 is capable of holding the slidelock 102 for restoring or sustaining the slidelock 102 in a fixed position. The slidelock 102 has a first and second claspers 114, a beam 118, and a push-button 116. The first and second claspers 114 are disposed at two ends of the beam 118 respectively and the push-button 116 is disposed on the beam 118.

Figure 2A:
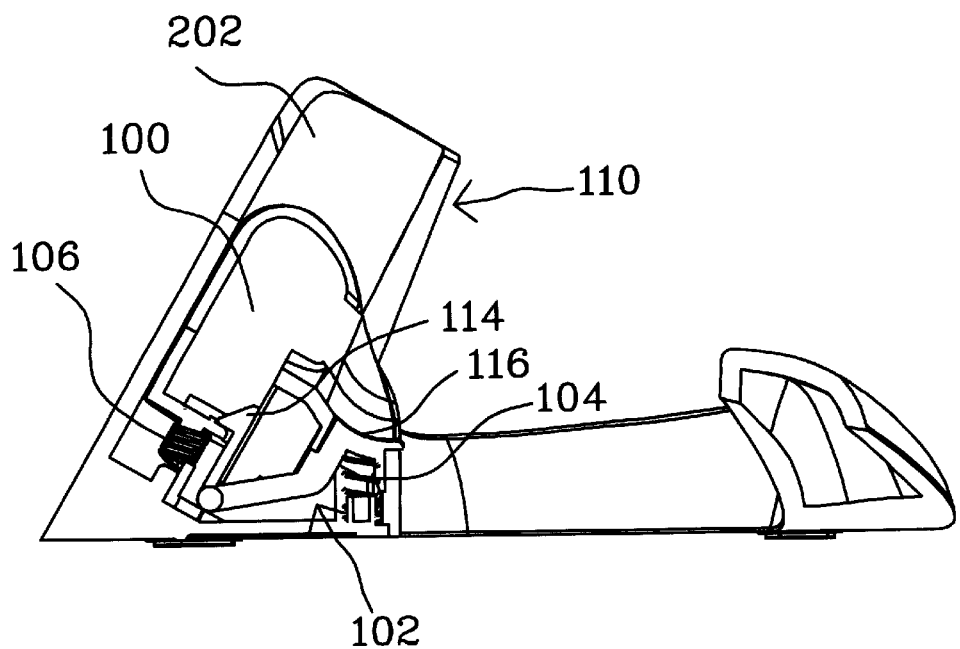
FIG. 2A shows a cutaway side view of a cradle with a lock mechanism clasped according to a preferred embodiment of the invention.
Figure 2B:
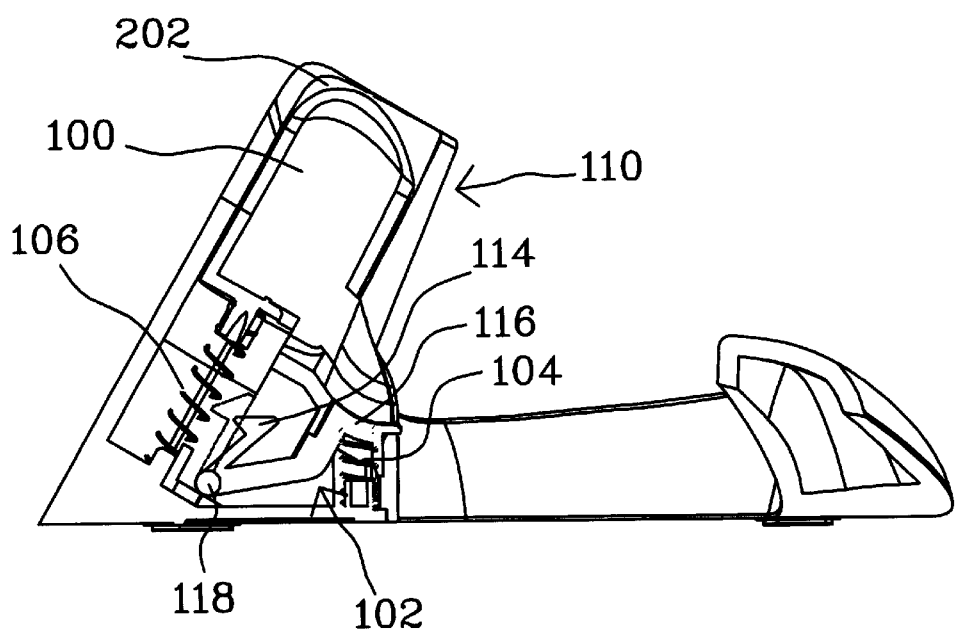
FIG. 2B shows a cutaway side view of a cradle with a lock mechanism unclasped according to a preferred embodiment of the invention.

Referring to FIGS. 2A–2B, the cutaway side views of a cradle with a lock mechanism clasped and unclasped according to the preferred embodiments of the invention are shown. The slide member 100 is disposed inside the cradle body 110 and contacts the arc blade 202 of the body 110. The slide member 100 moves along the inside of the arc blade 202 and drags the slide spring 106 upwards or downwards. As shown in FIG. 2A, the slide member 100 engages the lock mechanism when the slide member 100 moves downward along the inside of the arc blade 202 by an external force. The clasper 114 locks the slide mechanism by clasping the bottom of the slide member 100.

As shown in FIG. 2B, the slidelock 102 rotates around the beam 118 and the clasper 114 moves downward to unlock the slide mechanism by unclasping bottoms of the slide member 100 while a push-button 116 is pressed. The slide member 100 subsequently moves along the inside of the arc blade 202 upwards by elastic power of the slide spring 106 after compression. It then restores the cradle with the lock mechanism unclasped.

Figure 3:
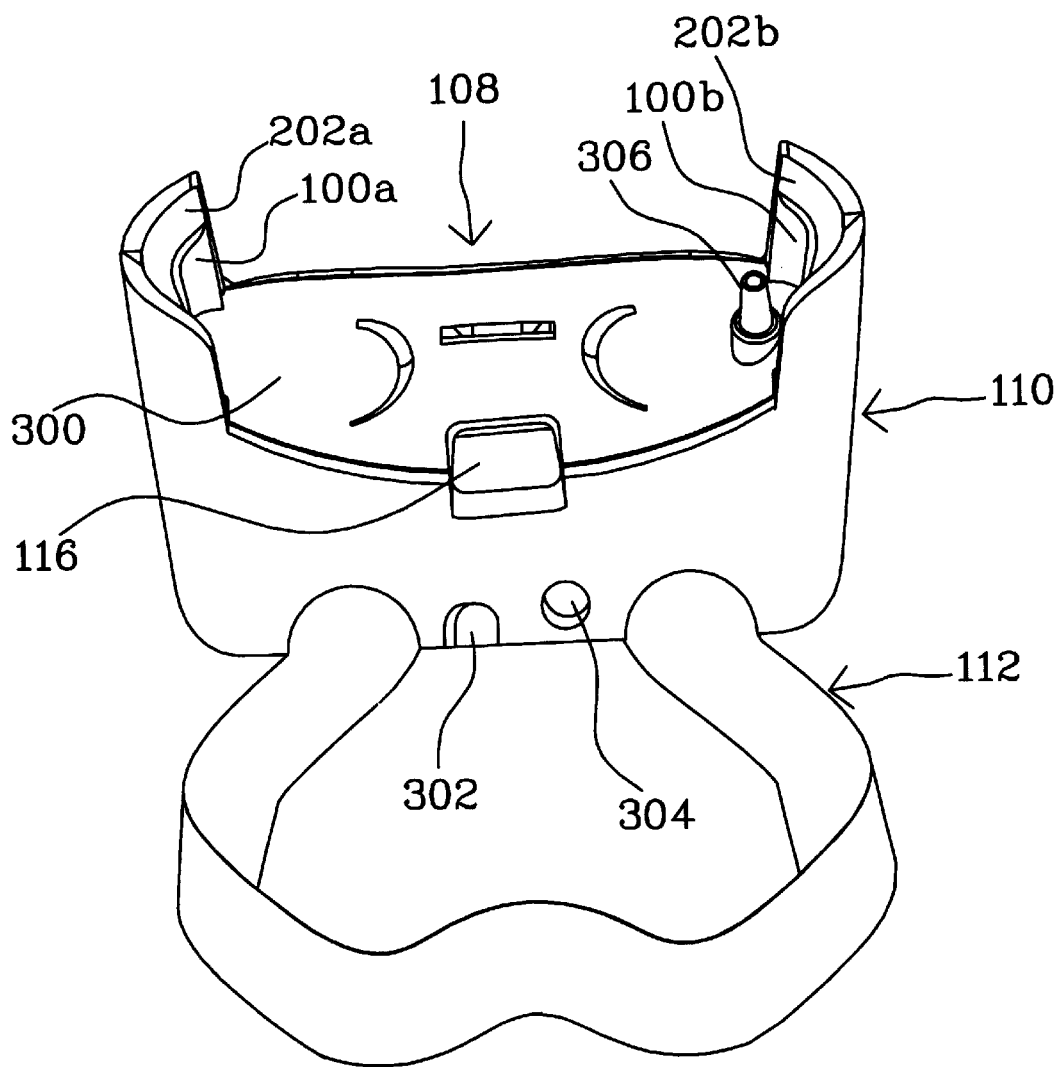
FIG. 3 shows a rear view of a cradle according to a preferred embodiment of the invention.

Referring to FIG. 3, a rear view of a cradle according to a preferred embodiment of the invention is shown. The first and second slide members 100a and 100b are disposed on two sides of the cradle body 110 and contact the first and second arc blades 202a and 202b respectively. As shown in FIG. 3, a port 302 and a socket 304 are disposed on the rear side of the body. When the object is placed on the cradle the object can be connected with a computer host for bi-directional data transmission, which makes the transmission between the object and computer host synchronous. The computer host can be a desktop computer or a notebook computer while the socket can be a serial port or USB port. The object can also be battery charged through the connection of the power plug (socket 304) and power supply. Besides, the bi-directional data transmission and the battery charging of the object can be proceeded simultaneously. The push-button 116 is located at the joint of the cap 108 and the cradle body 110. After pressing the push-button 116, the lock mechanism is then restored. The strut 306 on the upper surface 300 of the cap 108 holds up the object to avoid the battery charging or data transmission failing due to the shaking.

Figure 4A:
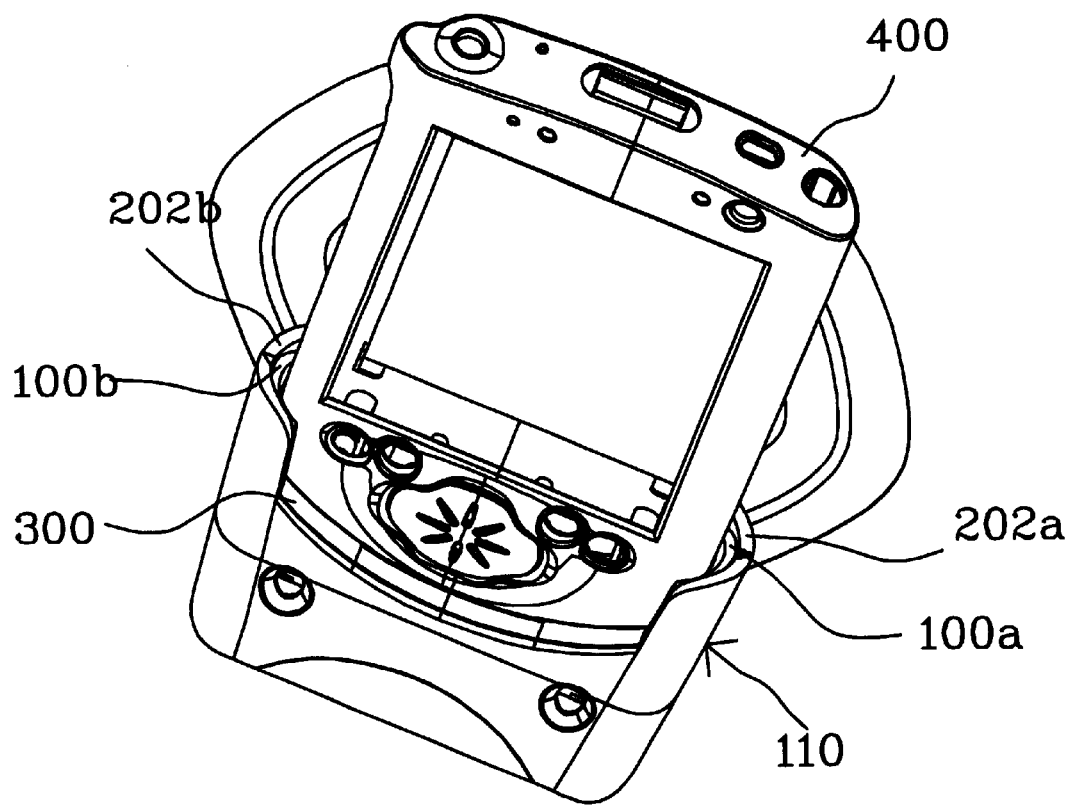
FIG. 4A shows a perspective view of a hand-held computer received by the cradle according to a preferred embodiment of the invention.

Referring to FIG. 4A, a perspective view of a hand-held computer received in a cradle according to the preferred embodiment of the invention is shown. As shown in FIG. 4A, the first and second slide members 100a and 100b contact the first and second arc blades 202a and 202b on two sides of the cradle body 110. The hand-held computer 400 is steadily placed on the first seat formed by an upper surface 300 of the cap 108, and the first and second slide members 100a and 100b.

Figure 4B:
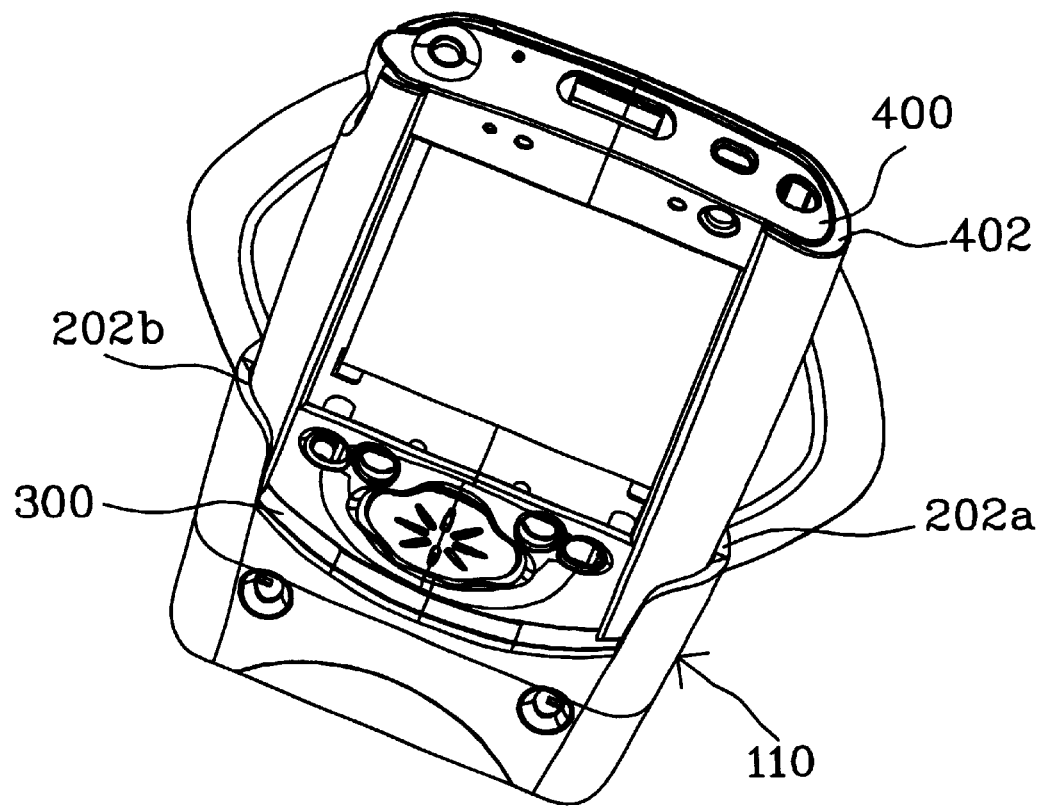
FIG. 4B shows a perspective view of a hand-held computer with a jacket received by the cradle according to a preferred embodiment of the invention.

Referring to FIG. 4B, a perspective view of a hand-held computer with a jacket received in a cradle according to the preferred embodiment of the invention is shown. A second seat for placing the hand-held computer with a jacket of a second size is formed while the slide mechanism is clasped by the lock mechanism. As shown in FIG. 4B, the first and second slide members 100a and 100b move downward along the insides of the first and second arc blades 202a and 202b when the hand-held computer 400 with a jacket 402 is inserted. The hand-held computer 400 with a jacket 402 is steadily placed on a second seat formed by the upper surface 300 of the cap 108, and the first and second arc blades 202a and 202b.

The cradle capable of receiving objects having alternative sizes according to the invention secures the hand-held computer by selective sliding of a pair of slide members. It can also provide the cradle with multiple selections for placing objects of different sizes by selective sliding of plural pairs of slide members without departing from the spirit and scope of the invention.

The cradle according to a preferred embodiment of the invention is able to secure the hand-held computer having alternative sizes firmly and avoids a negative effect of battery charging quality or data transmission due to unsteady connection. The hand-held computer with a jacket can be inserted onto the cradle. It therefore avoids harming the hand-held computer by taking off the jacket repeatedly. Moreover, it is convenient that the bi-directional data transmission with a computer host and the battery charging of the object can be proceeded simultaneously.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A cradle, comprising:
  a main unit for selectively loading and holding an object having a first or a second size, the first size being different from the second size;
  a slide mechanism adapted for adjusting a size of a room for receiving the object; and
  a lock mechanism for positioning the slide mechanism by clasping the slide mechanism, wherein when said slide mechanism is not clasped by said lock mechanism, a first seat is formed that is adapted to receive the object having the first size, and wherein when said slide mechanism is clasped by said lock mechanism, a second seat is formed that is adapted to receive the object having the second size.

2. A cradle, comprising:
  a main unit for loading and holding an object, said main unit comprising a cap, a body having a top and a bottom, and a base, the top and bottom of the body being coupled with the cap and base, respectively;
  a slide mechanism adapted for adjusting a size of a room for receiving the object; and
  a lock mechanism for positioning the slide mechanism by clasping the slide mechanism.

3. The method according to claim 2, wherein the body further comprises a first arc blade and a second arc blade, and wherein the slide mechanism further comprises a first slide member, a second slide member and two slide springs; the slide springs being coupled with a bottom of the first and second slide members, respectively; the first and second slide members contacting the first arc blade and second arc blade.

4. The cradle according to claim 2, wherein a port and a socket are disposed on a rear side of the body, the port allowing the object to be connected with a computer host for bi-directional data transmission with the object, and the socket allowing the object to be plugged in for battery charging of the object.

5. The cradle according to claim 3, wherein the first and second slide members move along an inside of the first and second arc blades and drag the slide springs upwards or downwards.

6. The cradle according to claim 3, wherein the lock mechanism further comprises a slidelock and a slidelock spring; the slidelock spring being adapted to hold the slidelock for restoring or sustaining the slidelock in a fixed position.

7. The cradle according to claim 3, wherein the object is a hand-held computer.

8. The cradle according to claim 7, wherein the hand-held computer is steadily placed on a first seat formed by an upper surface of the cap, and the first and second slide members.

9. The cradle according to claim 4, wherein the computer host is a desktop computer or notework computer.

10. The cradle according to claim 4, wherein the port is a serial port or a USB port.

11. The cradle according to claim 4, wherein the object is mobile phone.

12. The cradle according to claim 6, wherein the slidelock further comprises a first clasper, a second clasper, a beam and a push-button; the first and second claspers being disposed at two ends of the beam, respectively, and the push-button being disposed on the beam.

13. The cradle according to claim 7, wherein the hand-held computer with a jacket is steadily placed on a second seat formed by the upper surface of the cap, and the first and second arc blades.

14. The cradle according to claim 12, wherein the first and second claspers lock the slide mechanism by clasping bottoms of the first and second slide members, respectively.

15. The cradle according to claim 14, wherein the slidelock is rotatable around an axis of the beam, so that the first and second claspers are moved downward to unlock the slide mechanism by unclasping the bottoms of the first and second slide members, respectively, while the push-button is pressed; the first and second slide members subsequently moving upwards along an inside of the first arc blade and second arc blade by elastic power of the slide springs.

* * * * *